(12) United States Patent
Hunt et al.

(10) Patent No.: US 10,845,506 B2
(45) Date of Patent: Nov. 24, 2020

(54) TOPOLOGICAL INSULATOR PROTECTED OPTICAL ELEMENTS

(71) Applicant: The Boeing Company, Chicago, IL (US)

(72) Inventors: Jeffrey H. Hunt, Thousand Oaks, CA (US); Angela W. Li, Everett, WA (US); Wayne R. Howe, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 161 days.

(21) Appl. No.: 15/815,549

(22) Filed: Nov. 16, 2017

(65) Prior Publication Data
US 2019/0146121 A1 May 16, 2019

(51) Int. Cl.
| | | |
|---|---|---|
| G02B 1/14 | (2015.01) | |
| B05D 5/06 | (2006.01) | |
| G02B 1/02 | (2006.01) | |
| H01B 3/02 | (2006.01) | |
| B82Y 20/00 | (2011.01) | |

(52) U.S. Cl.
CPC ............ *G02B 1/14* (2015.01); *B05D 5/06* (2013.01); *G02B 1/02* (2013.01); *H01B 3/025* (2013.01); *B82Y 20/00* (2013.01)

(58) Field of Classification Search
CPC combination set(s) only.
See application file for complete search history.

(56) References Cited

U.S. PATENT DOCUMENTS

| | | |
|---|---|---|
| 5,508,489 A | 4/1996 | Benda et al. |
| 6,815,636 B2 | 11/2004 | Chung et al. |
| 7,515,986 B2 | 4/2009 | Huskamp |
| 9,296,007 B2 | 3/2016 | Li et al. |
| 9,630,209 B2 | 4/2017 | Hunt et al. |
| 9,632,542 B2 | 4/2017 | Li et al. |
| 9,732,418 B2 | 8/2017 | Li et al. |
| 2010/0140723 A1 | 6/2010 | Kurtz et al. |
| 2012/0138887 A1* | 6/2012 | Zhang .............. H01F 1/401 257/9 |
| 2014/0199542 A1 | 7/2014 | Li et al. |
| 2015/0165556 A1 | 6/2015 | Jones et al. |
| 2015/0174695 A1 | 6/2015 | Elfstroem et al. |
| 2015/0235799 A1* | 8/2015 | Jozwiak ........ H01L 29/66007 313/533 |
| 2015/0255184 A1 | 9/2015 | Li et al. |
| 2015/0257308 A1 | 9/2015 | Li et al. |
| 2016/0082617 A1 | 3/2016 | Howe et al. |

(Continued)

FOREIGN PATENT DOCUMENTS

WO  WO 2013/086227 A1  6/2013

OTHER PUBLICATIONS

Baughman et al. "Strong, Transparent, Multifunctional, Carbon Nanotube Sheets" Science 309 (5738), 1215-1219 (Year: 2005).*

(Continued)

*Primary Examiner* — Frank J Vineis
*Assistant Examiner* — Laura B Figg
(74) *Attorney, Agent, or Firm* — MH2 Technology Law Group LLP (57) ABSTRACT

Provided is a coated optical element that includes: an optical element; and a coating disposed on the optical element. The coating includes at least one layer of a topological insulator.

20 Claims, 4 Drawing Sheets

(56) References Cited

U.S. PATENT DOCUMENTS

| | | |
|---|---|---|
| 2016/0116679 A1 | 4/2016 | Muendel et al. |
| 2016/0158889 A1 | 6/2016 | Carter et al. |
| 2016/0168692 A1 | 6/2016 | Li et al. |
| 2017/0090119 A1 | 3/2017 | Logan et al. |
| 2017/0173737 A1 | 6/2017 | Gray |
| 2017/0306476 A1 | 10/2017 | Li et al. |

OTHER PUBLICATIONS

Steele, G.A. et al. "Large spin-orbit coupling in carbon nanotubes" Nature Communications 4:1573 (2013). (Year: 2013).*

Ando, Yoichi "Topological Insulator Materials" Journal of the Physical Society of Japan Issue 82 pp. 102001-1 to 102001-32, 2013 (Year: 2013).*

"Optical Device" entry at The Free Dictionary (Year: 2020).*

Peng, Hailin et al. "Selective-Area Van der Waals Epitaxy of Topological Insulator Grid Nanostructures for Broadband Transparent Flexible Electrodes" 2013, Advanced Materials, Communications vol. 25 pp. 5959-5964 (Year: 2013).*

Ando et al., "Topological Insulator Materials," Journal of the Physical Society of Japan, Invited Review Papers, 2013, pp. 1-36.

Hasan et al., "Colloquium: Topological Insulators," The Amer. Phys. Soc., Reviews of Modern Physics, vol. 82, Oct.-Dec. 2010, pp. 3045-3067.

Hills et al., "From Graphene and Topological Insulators to Weyl Semimetals," WSPC/Instruction File, 2015, pp. 1-33.

HLA, "Single Atom Extraction by Scanning Tunneling Microscope Tip-Crash and Nanoscale Surface Engineering," Nanoscale & Quantum Phenomena Institute, Physics & Astronomy Department, Ohio University, Athens, OH, date unknown, pp. 1-15.

HLA, "STM Single Atom/Molecule Manipulation and Its Application to Nanoscience and Technology," Critical Review article, J. Vac. Sci. Tech, 2005, p. 1-12.

Khanikaev et al., Photonic Topological Insulators, Nature Materials, vol. 12, Mar. 2013, pp. 233-239.

Kong et al., "Opportunities in Chemistry and Materials Science for Topological Insulators and Their Nanostructures," Nature Chemistry, vol. 3, Nov. 2011, pp. 845-849.

Kuzmenko et al., Universal Dynamical Conductance in Graphite, *DPMC, University of Geneva, Switzerland*, 2007, pp. 1-5.

Li et al., "Marginal Topological Properties of Graphene: a Comparison with Topological Insulators," *DPMC, University of Geneva, Switzerland*, 2012, pp. 1-9.

Mak et al., "Optical Spectroscopy of Graphene: From the Far Infrared to the Ultraviolet," Solid State Communications, 152 (2012), 1341-1349.

Mingareev et al., "Laser Additive Manufacturing Going Mainstream," Optics and Photonics News, Feb. 2017, 8 pages.

Moore, "The Birth of Topological Insulators," Nature, vol. 464, Insight Perspective (2010), pp. 194-198.

Peng et al., "Topological Insulator Nanostructures for Near-Infrared Transparent Flexible Electrodes," Nature Chemistry, vol. 4, Apr. 2012, pp. 281-286.

Qi et all, "Topological Insulators and Superconductors," arXiv:1008.2026v1 [cond-mat.mes-hall], (2010), pp. 1-54.

Zhang, "Viewpoint: Topological States of Quantum Matter," American Physical Society, Physics 1, 6 (2008), 3 pages.

Zhu et al., "Optical Transmittal of Multilayer Graphene," EPL, 108 (2014) 17007, 4 pages.

Gu, "Chapter 2—Laser Additive Manufacturing (AM): Classification, Processing Philosophy, and Metallurgical Mechanisms," Laser Additive Manufacturing of High-Performance Materials, 2015, XVII, pp. 15-24.

Wikipedia, Graphene, https://en.wikipedia.org/wiki/Graphene, 29 pages, downloaded Nov. 15, 2017.

Wikipedia, Scanning Tunneling Microscope, https://en.wikipedia.org/wiki/Scanning_Tunneling_Microscope, 9 pages.

Wikipedia, "Nanometre," https://en.wikipedia.org/wiki/Nanometre, 2 pages.

Wikipedia, "Carbon Nanotube," https://en.wikipedia.org/wiki/Carbon_Nanotube, 22 pages.

* cited by examiner

TOPOLOGICAL INSULATOR PROTECTED OPTICAL ELEMENTS

TECHNICAL FIELD

The present disclosure relates generally to coated optical elements, apparatus comprising coated optical elements, and methods of coating optical elements.

BACKGROUND

Optical elements are generally optimized for their optical characteristics, such as transmittance or reflectivity in a desired spectral region. However, in many applications, an optical element may be exposed to mechanical stress. Therefore, some optical elements are coated with a material intended to provide improved mechanical performance, such as improved hardness. Unfortunately, the addition of a coating to an optical element can degrade the element's optical properties. Many coatings that provide a large improvement in mechanical performance also cause a large degradation in optical performance.

SUMMARY

In one aspect there is a coated optical element comprising: an optical element; and a coating disposed on the optical element, wherein the coating comprises at least one layer comprising a topological insulator (TI).

In one aspect, there is an apparatus comprising: a coated optical element comprising an optical element and a coating disposed on the optical element, wherein the coating comprises at least one layer comprising a TI, and wherein the coated optical element is exposed to an external environment of the apparatus.

In one aspect, there is a method of coating an optical element comprising: providing an optical element; and forming a coating on a surface of the optical element, wherein the at least one layer comprises a TI.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE FIGURES

The accompanying drawings, which are incorporated in and constitute a part of this specification, illustrate examples of the present teachings and together with the description, serve to explain the principles of the disclosure.

DETAILED DESCRIPTION

Reference will now be made in detail to the present examples, examples of which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter may take on negative values. In this case, the example value of range stated as "less than 10" may assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples may be combined with one or more other examples to form new examples. It will be understood that the structures depicted in the figures may include additional features not depicted for simplicity, while depicted structures may be removed or modified.

Individual atoms have quantized discrete energy levels which are occupied by each individual atom's electrons. In the case of a solid, however, many atoms are in close proximity to one another and the discrete energy levels of the individual atoms combine to form so-called "energy bands." These energy bands are defined by energies that can be determined by spectroscopically measuring the bandgap in the solid, for example, according to known spectroscopic methods, such as wavelength modulation spectroscopy. Generally, photons having energy values that lie below the bandgap will transmit through the solid while photons having energy values at or above the bandgap will be strongly absorbed. In wavelength modulation spectroscopy, the relative absorption of the photons is correlated with the band density of states.

The energy bands describe electron behavior within the solid. For example, in these energy bands, electron energy can be described as a function of the electron's wave-vector as the electron travels through the solid. Macroscopic behavior of many electrons in the solid—electrical conductivity, thermal conductivity, and the like—result from the band structure. Ordinarily, the geometric construction of solids do not have an effect on the band structure. However, for very thin solids such as graphene, not only does the solid's geometry change but so too does its band structure. That is, for thin solids, the electron behavior changes as the geometry of the solid changes. Thus, whether a solid is a defined as a "2D-" or "3D-structure" depends on the solid's band structure. For example, graphene is monoatomic and its 2D band structure only exists when it is one atomic layer thick. The addition of more atomic layers (i.e., from single-layer graphene to few-layer graphene) not only increases graphene's thickness, but also changes its band structure toward its 3D configuration. In contrast, topological insulators comprise several different atoms and can be molecularly engineered. Thus, unlike graphene which faces the aforementioned issues to changes in its band structure, a topological insulator largely maintains its 2D band structure even as the material's thickness is changed.

In one aspect, coated optical elements are described herein. In some implementations, a coated optical element comprises an optical element and a coating disposed on a surface of the optical element wherein the coating comprises at least one layer comprising a TI. The coating, in some implementations, provides improved mechanical performance to the optical element without substantially altering the optical properties of the underlying optical elements regardless of whether the elements are passive or active. For example, the coating comprising at least one layer having a TI as described herein can have increased absolute transmittance and/or reduced Fresnel loss compared to prior coatings while also exhibiting improved hardness. Moreover, in some implementations, the coating as described herein can have improved optical properties, even at larger thicknesses, as compared to other coated optical elements.

In an implementation, an optical element described herein comprises a coating disposed on a surface, such as an environment-facing surface, of the optical element. The coating comprises at least one layer comprising at least one topological insulator. For example, the coating can comprise a single layer comprising a single TI or a single layer comprising more than one TI. For example, the coating can comprise more than one layer, wherein each of the more than one layer comprises a single TI and wherein the single TI in each of the more than one layer can be the same or a different TI than in any one of the other more than one layer. For example, the coating can comprise more than one layer wherein the TI in each of the more than one layer is the same TI as that of at least one other of the more than one layer, or the coating can comprise more than one layer wherein the TI in each of the more than one layer is different than a TI of at least one other of the more than one layers. For simplicity, as used herein the term "TI coating" refers to a coating that comprises at least one layer, wherein the at least one layer comprises at least one topological insulator.

Any topological insulator not inconsistent with the objectives of the present disclosure may be used. For example, while not intended to be limited to any specific implementation, and for reference purposes herein, a "topological insulator" means a two-dimensional ("2D") or three-dimensional ("3D") material with time-reversal symmetry and topologically protected edge states (2D) or surface states (3D). For example, a 2D topological insulator generally will not conduct current across the surface of the 2D material, but can carry current along the edges of the 2D material. In another example, a 3D topological insulator generally will not conduct current through the bulk of the 3D material, but can carry current along the surface of the 3D material. The TI coating can comprise a TI that is a non-carbon-based TI. As used herein, the term "non-carbon-based topological insulator" or "non-carbon-based TI" means a TI whose crystal structure does not include carbon. Some 2D, non-carbon-based topological insulators can comprise, consist essentially of, or consist of, for example, one or more of antimony (Sb), bismuth (Bi), selenium (Se), or tellurium (Te), or combinations thereof.

Topological insulators described herein, such as for example, the non-carbon based topological insulators described herein, can comprise, consist essentially of, or consist of, but are not limited to, one or more of $Bi_{1-x}Sb_x$ (0<x<1) (e.g., $Bi_{0.9}Sb_{0.1}$), $Bi_{1-x}Te_x$ (0<x<1), $Bi_{1-x}Te_x$ (0<x<1), Sb, $Bi_2Se_3$, $Bi_2Te_3$, $Sb_2Te_3$, $Bi_2Te_2Se$, $(Bi,Sb)_2Te_3$ (e.g., $(Bi_{0.2}Sb_{0.8})_2Te_3$), $Bi_{2-x}Sb_xTe_{3-y}Se_y$ (0≤x≤2; 0≤y≤3), $Bi_{1-x}Sb_xTe_{3-y}Se_y$ (0≤x≤2; 1≤y≤3) (e.g., $Bi_2Te_{1.95}Se_{1.05}$, $BiSbTe_{1.25}Se_{1.75}$), $Bi_2Te_{1.6}S_{1.4}$, $Bi_{1.1}Sb_{0.9}Te_2S$, $Sb_2Te_2Se$, $Bi_2(Te,Se)_2(Se,S)$, $TlBiSe_2$, $TlBiTe_2$, $TlBi(S_{1-x}Se_x)_2$ (0.5≤x≤1), $Pb(Bi_{1-x}Sb_x)_2Te_4$ (0≤x≤1), $PbBi_2Te_4$, $PbSb_2Te_4$, $PbBi_4Te_7$, $GeBi_2Te_4$, $GeBi_{4-x}Sb_xTe_7$ (0≤x≤4), $(PbSe)_5(Bi_2Se_3)_3$, $(PbSe)_5(Bi_2Se_3)_6$, $(Bi_2)(Bi_2Se_{2.6}S_{0.4})$, $Bi_4Se_3$, $Bi_4Se_{2.6}S_{0.4}$, $(Bi_2)(Bi_2Te_3)_2$, SnTe, $Pb_{1-x}Sn_xSe$ (0<x<1), $Pb_{1-x}Sn_xTe$ (0<x<1), $Pb_{0.77}Sn_{0.23}Se$, $Bi_{1.84-x}Fe_{0.16}Ca_xSe_3$ (0≤x≤1.84), $Cr_{0.08}(Bi_{0.1}Sb_{0.9})_{1.92}Te_3$, $(Dy_xBi_{1-x})_2Te_3$ (0<x<1), $Ni_xBi_{2-x}Se_3$ (0<x<2), $(Ho_xBi_{1-x})_2Se_3$ (0≤x≤1), $Ag_2Te$, $SmB_6$, $Bi_{114}Rh_3I_9$, $Bi_{2-x}Ca_xSe_3$ (0<x<2), $Bi_{2-x}Mn_xTe_3$ (0<x<2) (e.g., $Bi_{1.91}Mn_{0.09}Te_3$, $Bi_{1.96}Mn_{0.04}Te_3$, $Bi_{1.98}Mn_{0.02}Te_3$), $Ba_2BiBrO_6$, $Ba_2BiIO_6$, $Ca_2BiBrO_6$, $Ca_2BiIO_6$, $Sr_2BiBrO_6$, or $Sr_2BiIO_6$, or combinations thereof.

The TI coating can have selected optical transmittance. As used herein, the term "optical transmittance" means the fraction of incident electromagnetic power that is transmitted through a substance, mixture, or material. The selected optical transmittance can provide improved optical properties, such as improved optical clarity, improved transmittance, and/or improved protection from ultraviolet radiation. One or more dopants can be used to tune one or more of the topological insulators of the one or more layers of the TI coating in order to achieve desired optical transmittance, as understood by one of ordinary skill in the art.

The TI coating have selected thermal conductivity. As used herein, the term "thermal conductivity" means the ability to transfer heat through a substance, mixture, or material. The selected thermal conductivity can provide improved thermodynamic properties, such as improved protection from the environment, improved control over energy dissipation, and/or improved control over energy retention. One or more dopants can be used to tune one or more of the topological insulators of the one or more layers of the TI coating in order to achieve desired levels of thermal conductivity, as understood by one of ordinary skill in the art.

The TI coating can have selected electrical conductivity. As used herein, the term "electrical conductivity" means the ability to transfer electricity through a substance, mixture, or material. The selected electrical conductivity can provide improved electrical properties, such as enhanced fire resistance, improved control over energy dissipation, and/or improved control over energy retention. One or more dopants can be used to tune one or more of the topological insulators of the one or more layers of the TI coating in order to achieve these levels of electrical conductivity, as understood by one of ordinary skill in the art.

The TI coating can have selected electrical resistivity. As used herein, the term "electrical resistivity" means resistance to the transfer of electricity through a substance, mixture, or material. The selected electrical resistivity can provide improved electrical properties, such as enhanced fire resistance, improved control over energy dissipation, and/or improved control over energy retention. One or more dopants can be used to tune one or more of the topological insulators of the one or more layers of the TI coating in order to achieve these levels of electrical resistivity, as understood by one of ordinary skill in the art.

One or more dopants can be used to tune the TI coating in order to achieve these levels of optical transmittance, thermal conductivity, electrical conductivity, and/or electrical resistivity as understood by one of ordinary skill in the art. The doping can comprise, for example, interstitial doping of a crystal structure of at least one 2D or 3D, TI. Such doping can break the time-reversal symmetry of the at least one 2D or 3D TI. Potential dopants for TI materials described herein include, for example, semiconductors, rare earth elements, transition metals, and/or other elements. Such semiconductors can include, for example, germanium ("Ge"), silicon ("Si"), and silicon-germanium alloys (e.g., $Si_{1-x}Ge_x$ (0<x<1)). Such rare earth elements can include, for example, cerium ("Ce"), dysprosium ("Dy"), erbium ("Er"), europium ("Eu"), gadolinium ("Gd"), holmium ("Ho"), lanthanum ("La"), lutetium ("Lu"), neodymium ("Nd"), praseodymium ("Pr"), promethium ("Pm"), samarium ("Sm"), scandium ("Sc"), terbium ("Tb"), thulium ("Tm"), ytterbium ("Yb"), and yttrium ("Y"). Such transition metals can include, for example, bohrium ("Bh"), cadmium ("Cd"), chromium ("Cr"), cobalt ("Co"), copernicium ("Cn"), copper ("Cu"), darmstadtium ("Ds"), dubnium ("Db"), gold ("Au"), hafnium ("Hf"), hassium ("Hs"), iridium ("Ir"), iron ("Fe"), manganese ("Mn"), meitnerium ("Mt"), mercury ("Hg"), molybdenum ("Mo"), nickel ("Ni"), niobium ("Nb"), osmium ("Os"), palladium ("Pd"), platinum ("Pt"), rhenium ("Re"), rhodium ("Rh"), roentgenium ("Rg"), ruthenium ("Ru"), rutherfordium ("Rf"), seaborgium ("Sg"), silver ("Ag"), tantalum ("Ta"), technetium ("Tc"), titanium ("Ti"), tungsten ("W"), vanadium ("V"), zinc ("Zn"), and zirconium ("Zr"). Such other elements can include, for example, antimony ("Sb"), calcium ("Ca"), magnesium ("Mg"), oxygen ("O"), strontium ("Sr"), tin ("Sn"), and combinations thereof.

In some implementations, the TI coating comprises a non-carbon-based TI. For example, the TI coating may not comprise, consist, or consist essentially of carbon, including any allotrope of carbon, such as graphene. For example, in some implementations, the TI coating comprises no graphene or substantially no graphene. In some implementations, the TI coating comprises no carbon or substantially no carbon, such as no allotrope of carbon or substantially no allotrope of carbon. That is, in some implementations, the at least one layer of the coating does not comprise more than trace amounts of carbon. For example, in some implementations, the coating comprises less than about 10 atom percent or less than about 5 atom percent $sp^2$-bonded carbon relative to the total amount of other elements that make up the topological insulator coating layer. Additionally, in some implementations, the coating described herein comprises no $sp^3$-hybridized carbon or substantially no $sp^3$-hybridized carbon. For example, in some implementations, a coating comprises less than about 10 atom percent or less than about 5 atom percent $sp^3$ hybridized carbon, relative to the total amount of carbon in the coating layer. In some implementations, the coating comprises less than about 2 atom percent or less than about 1 atom percent $sp^3$-hybridized carbon. Moreover, the coating as described herein, in some implementations, does not comprise, consist, or consist essentially of diamond-like carbon (DLC).

The TI coating described herein can have any thickness, t, not inconsistent with the objectives of the present disclosure. In some implementations, for example, a coating has a thickness of about 300 nm or less or about 200 nm or less. In some implementations, a coating has a thickness of about 100 nm or less. In some implementations, a coating has a thickness of about 50 nm or less, about 10 nm or less, or about 5 nm or less. In some implementations, a coating has a thickness of about 3 nm or less, about 2 nm or less, or about 1 nm or less. In some implementations, a coating described herein has a thickness greater than about 100 nm.

In some implementations, the TI coating as described herein comprises at least one layer wherein each of the at least one layer can have a thickness $t_n$. For example, the coating can comprise a plurality of layers wherein a total thickness $t_t$ of any one of the plurality of layers can be equal to a thickness t of the coating as described above, and a thickness of any one of the one or more layers can be the same as or different than the thickness of any other one of the plurality of layers.

Figure 1A:
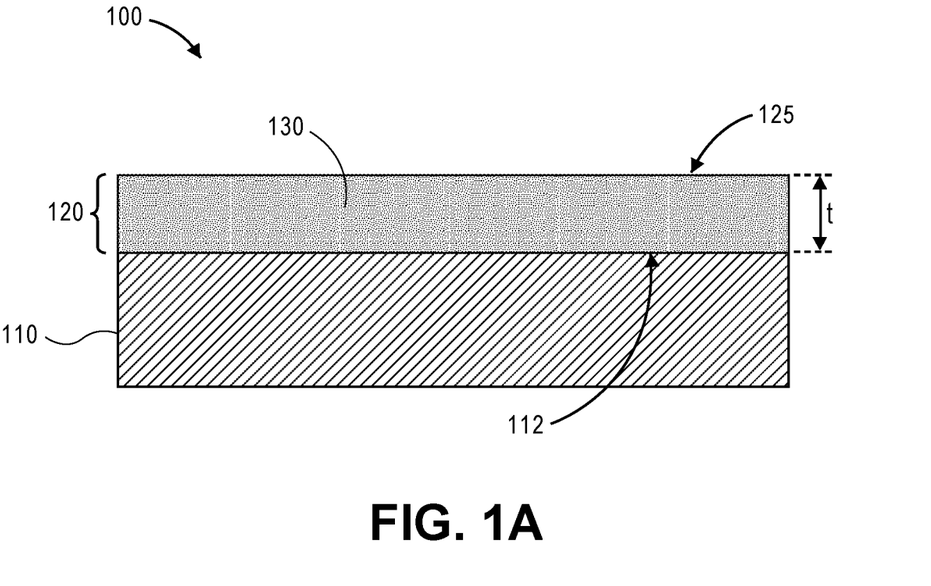
FIG. 1A illustrates cross-sectional view of a coated optical element according to one implementation described herein.
Figure 1B:
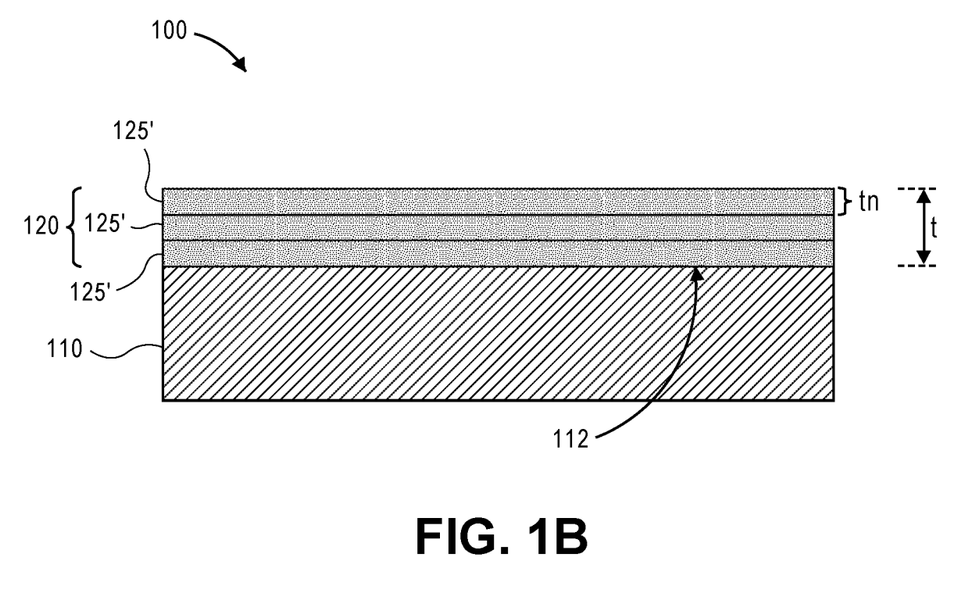
FIG. 1B illustrates cross-sectional view of a coated optical element according to one implementation described herein.

FIGS. 1A-1B illustrate a cross-sectional views of a coated optical element comprising a coating disposed on a surface of the optical element, wherein the coating comprises at least one layer comprising a topological insulator. As understood by one of ordinary skill in the art, the various elements depicted in FIGS. 1A-1B are representational only and are not necessarily drawn to scale. In the implementation of FIG. 1A, a coated optical element 100 comprises an optical element 110 and a coating 120, such as a TI coating, disposed on a surface 112 of the optical element 110. The coating 120 has a thickness, t, and comprises at least one layer 125. The at least one layer 125 is illustrated as comprising a topological insulator 130, but in other implementations can comprise more than one topological insulator.

Topological insulator 130 is depicted in FIGS. 1A-1B as a shaded portion of the at least one layer 125. However, as understood by one of ordinary skill in the art, such a depiction is for illustration purposes only. In addition, optical element 110 is depicted schematically in FIGS. 1A-1B as having a rectangular cross section and a flat planar surface. However, other implementations are also possible. For example, in some implementations, an optical element can have a circular, elliptical, or other cross sectional shape. Any size and shape not inconsistent with the objectives of the present disclosure can be used. Similarly, in some implementations, the surface 112 of the optical element 110 can have a curvature, including a convex curvature, a concave curvature, or a periodic or undulating curvature.

As illustrated in FIG. 1A, the coating is shown as comprising at least one layer 125. In an implementation illustrated in FIG. 1B, the at least one layer 125 comprises a plurality of layers 125'. In an implementation, the at least one topological insulator comprises a plurality of topological insulators. In an implementation, the at least one layer comprises a plurality of layers. For example, each layer of the plurality of layers can comprise one or more topological insulators from the plurality of topological insulators, and/or at least one layer of the plurality of layers can comprise the same or different topological insulator(s) as compared to at least one other layer of the plurality of layers.

In some implementations, the topological insulator can comprise, consist, or consist essentially of one or more topological insulator sheets. A topological insulator sheet, in some implementations, can comprise a single molecular or atomic layer having a flat planar structure. Any number of topological insulator sheets not inconsistent with the objectives of the present disclosure can be used. In implementations, the topological insulator comprises a single topological insulator sheet or a plurality of topological insulator sheets. The plurality of topological insulator sheets can be arranged in a stacked or layered configuration. In an example, the coating can comprise at least one layer, wherein the at least one layer comprises 1 or more of a topological insulator sheet, such as from 1 to 10 of a topological insulator sheet, including from 1 to 5 and from 1 to 3 of a topological insulator sheet. In some implementations the topological insulator sheet(s) can be oriented parallel to a major plane of an underlying substrate surface or perpendicular to the major plane of the underlying substrate's surface.

In some implementations, at least one topological sheet is oriented parallel to a major plane of the underlying substrate's surface and at least one other topological insulator sheet is oriented perpendicular to the major plane of the underlying substrate's surface. The orientation of the topological insulator layer sheet(s) can be used to engineer the TI coating's dielectric properties, optical transmittance, electrical conductivity, electrical resistivity (e.g., piezoresistance) and mechanical properties (e.g., hardness) of the TI coating.

Figure 2:
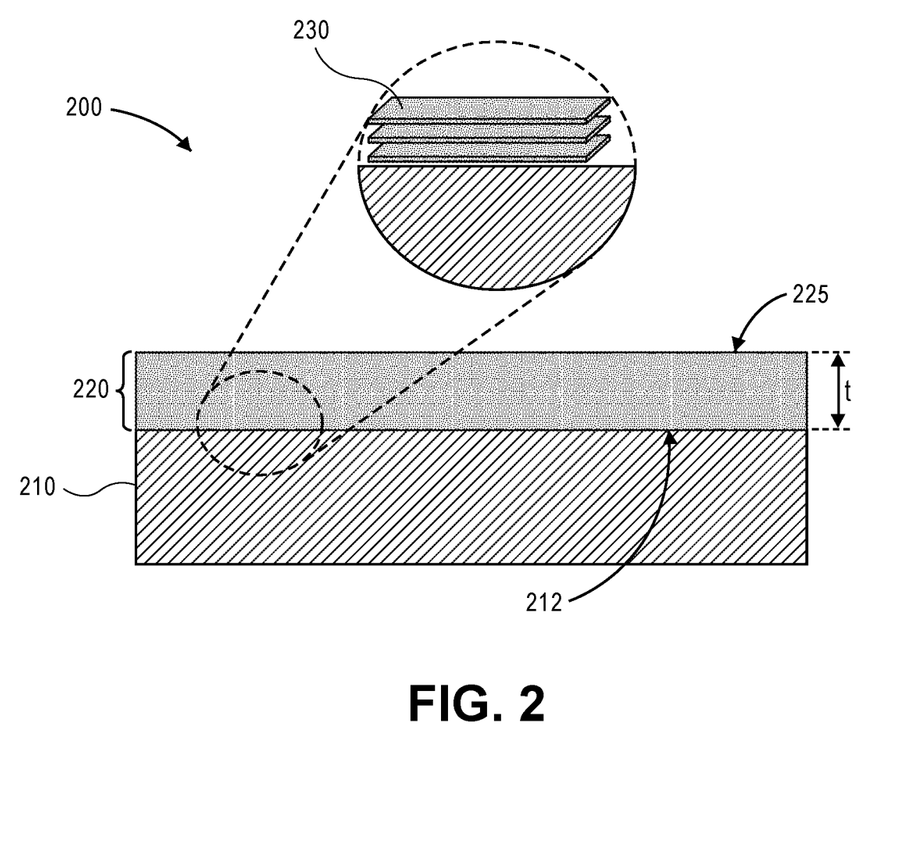
FIG. 2 illustrates a cross-sectional of a coated optical element according to one implementation described herein.

FIG. 2 illustrates a cross-sectional view of a coated optical element comprising a coating disposed on a surface of the optical element, wherein the coating comprises at least one layer, wherein the at least one layer comprises at least one topological insulator, wherein the at least one topological insulator comprises at least one topological insulator sheet. As understood by one of ordinary skill in the art, the various elements depicted in FIG. 2 are representational only and are not necessarily drawn to scale. In the implementation of FIG. 2, a coated optical element 200 comprises an optical element 210, coating 220 disposed on a surface 212 of the optical element 210, and at least one layer 225 comprising at least one topological insulator. As illustrated in the inset in FIG. 2, the at least one topological insulator comprises one or more of a topological insulator sheet 230. Each of the one or more of a topological insulator sheet 230 is depicted schematically in FIG. 2 by a flattened rectangular cuboid. However, as understood by one of ordinary skill in the art, such a depiction is for illustration purposes only. In addition, optical element 210 is depicted schematically in FIG. 2 as having a rectangular cross section and a flat planar surface. However, other implementations are also possible. For example, in some implementations, an optical element can have a circular, elliptical, or other cross-sectional shape. Any size and shape not inconsistent with the objectives of the present disclosure can be used. Similarly, in some implementations, the surface 212 of the optical element 210 can have a curvature, including a convex curvature, a concave curvature, or a periodic or undulating curvature.

In other implementations, a coating described herein comprises, consists, or consists essentially of a layer of topological insulator tube. Any topological insulator tubes not inconsistent with the objectives of the present disclosure can be used. For example, topological insulator tubes can comprise any topological insulator material not inconsistent with the objectives of the present disclosure, for example, any of the aforementioned topological insulator materials. In some implementations, topological insulator tubes comprise topological insulator nanotubes such as single-walled topological insulator nanotubes or multi-walled topological insulator nanotubes. Moreover, topological insulator tubes can have any size not inconsistent with the objectives of the present disclosure. For example, in some implementations, topological insulator tubes have a size in at least one dimension of less than about 300 nm or less than about 100 nm. In some implementations, topological insulator tubes have a size in at least one dimension of from about 1 nm to about 200 nm, of from about 1 nm to about 150 nm, or from about 5 nm to about 100 nm. In some implementations, topological insulator tubes have a size in at least one dimension of from about 5 nm to about 75 nm or from about 15 nm to about 60 nm. In some implementations, topological insulator tubes have a size in at least one dimension of from about 20 nm to about 30 nm or from about 45 nm to about 55 nm. In some implementations, topological insulator tubes have a size in at least two dimensions of less than about 300 nm or less than about 100 nm. In some implementations, topological insulator tubes have a size in at least two dimensions of from about 1 nm to about 200 nm, from about 1 nm to about 150 nm, or from about 5 nm to about 100 nm. In some implementations, topological insulator tubes have a size in at least two dimensions of from about 5 nm to about 75 nm or of from about 15 nm to about 60 nm.

Moreover, in some implementations, topological insulator tubes have a low aspect ratio. In some implementations, topological insulator tubes have an aspect ratio of about 20 or less or about 10 or less. In some implementations, topological insulator tubes have an aspect ratio of from about 2 to about 15 or of from about 3 to about 10. In addition, topological insulator tubes having an aspect ratio of about 20 or less, in some implementations, have a length ranging from about 5 nm to about 200 nm or from about 10 nm to about 100 nm.

Further, the topological insulator tubes, in some implementations, can be oriented in the at least one layer of the coating described herein. In some implementations, one or more topological insulator tubes can be oriented horizontally or substantially horizontally in the at least one layer of the coating (i.e., the TI coating). In other implementations, one or more topological insulator tubes can be oriented vertically or substantially vertically in the layer of the coating (i.e., the TI coating). Moreover, in some implementations, vertically or substantially vertically oriented topological insulator tubes in at least one layer of the coating are aligned or substantially aligned with one another, including in an array. The orientation of the topological insulator layer tubes can be used to engineer the TI coating's dielectric properties, optical transmittance, electrical conductivity, electrical resistivity (e.g., piezoresistance) and mechanical properties (e.g., hardness) of the TI coating.

Figure 3A:
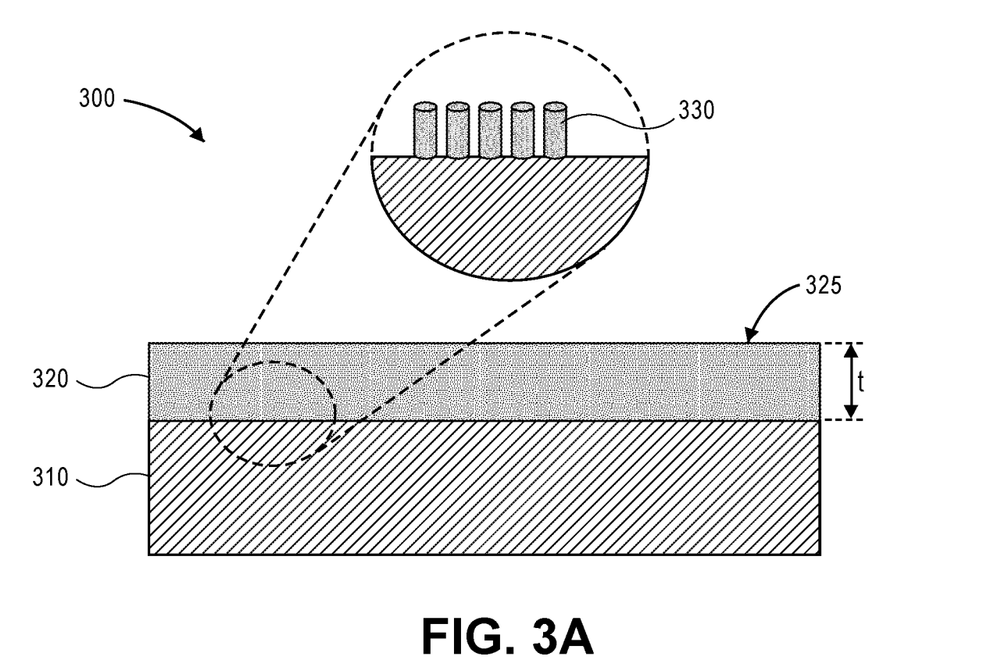
FIG. 3A illustrates a cross-sectional of a coated optical element according to one implementation described herein.
Figure 3B:
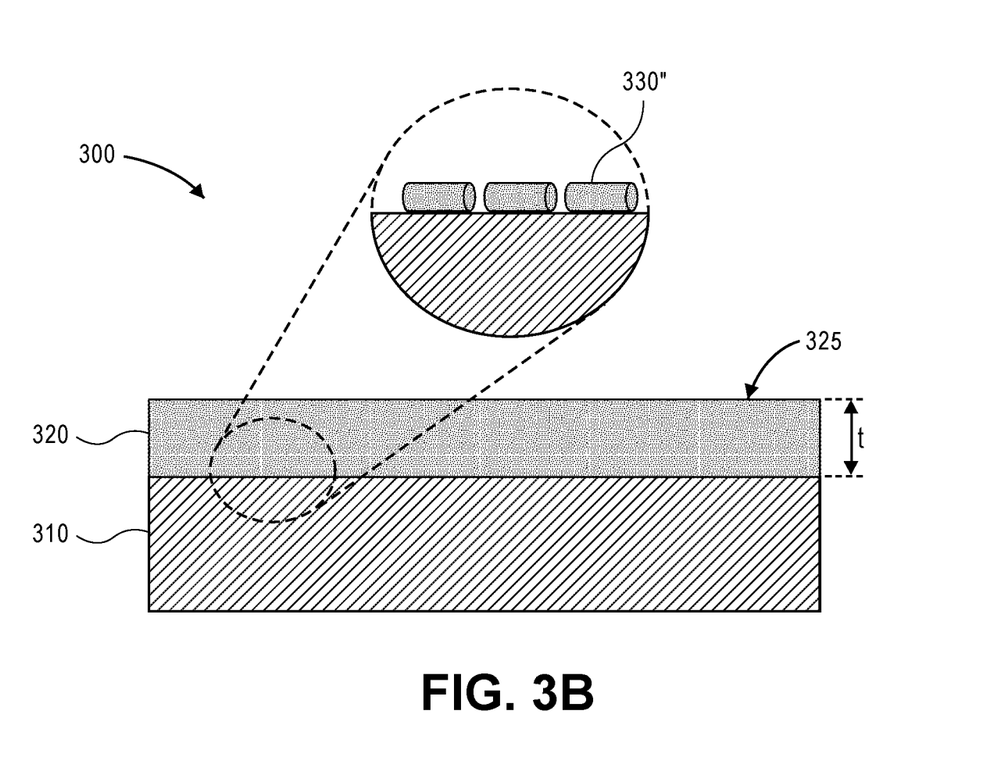
FIG. 3B illustrates a cross-sectional of a coated optical element according to one implementation described herein.

FIGS. 3A and 3B each illustrate illustrates a cross-sectional view of a coated optical element comprising a coating disposed on a surface of the optical element, wherein the coating comprises at least one layer, wherein the at least one layer comprises at least one topological insulator, wherein the at least one topological insulator comprises a plurality of topological insulator tubes according to some implementations described herein. With reference to FIGS. 3A-3B, a coated optical element 300 comprises an optical element 310 and a coating 320 disposed on a surface 312 of the optical element 310. In the implementation of FIGS. 3A-3B, the coating 320 of coated optical element 300 comprises at least one layer 325 having a plurality of topological insulator tubes 330. In some implementations, one or more of the plurality of topological insulator tubes 330, for example, at least about 60 percent, at least about 70 percent, at least about 80 percent, or at least about 90 percent of the plurality of topological insulator tubes can be oriented such that the tubes have their long axis oriented at an angle relative to a major plane of surface 312. For example, the long axis of the tubes can be oriented parallel relative to the major plane of surface 312, perpendicular relative to a major plane of surface 312, or at an angle relative to the major plane of surface 312 including angles in the range of from about 0° to 90° such as less than 45°, including angles in the range of from about 0° to 30° such as less than about 15°.

As illustrated in the inset of FIG. 3A, the at least one layer 325 comprises a plurality of topological insulator tubes 330 oriented horizontally or substantially horizontally to a major plane of the surface 312 of the optical element 310. Horizontal orientation is relative to the major plane of surface 312. For reference purposes herein, a "horizontal" orientation comprises an orientation wherein the long axis of a topological insulator tube 330 is oriented substantially parallel to a major plane of surface 312.

As illustrated in the inset of FIG. 3B, the at least one layer 325 comprises a plurality of topological insulator tubes 330 oriented vertically or substantially vertically to a major plane of the surface 312 of the optical element 310. Vertical orientation is relative to the major plane of surface 312. For reference purposes herein, a "vertical orientation" comprises an orientation wherein the long axis of a topological insulator tube 330 is oriented substantially perpendicular to the major plane of surface 312.

In addition, in some implementations, a topological insulator described herein comprises, consists, or consists essentially of a monolayer of topological insulator tubes, including a monolayer of horizontally or substantially horizontally oriented topological insulator tubes, a monolayer of vertically of substantially vertically oriented topological insulator tubes, or a monolayer of topological insulator tubes having a long axis oriented at an angle relative to a major plane of a surface of an optical element.

Further, in some implementations wherein a coating is disposed on a surface of the optical element, wherein the coating comprises at least one layer, wherein the at least one layer comprises at least one topological insulator, and wherein the at least one topological insulator comprises a plurality of insulator tubes, the average thickness, t, of the coating is no greater than about 50 times the average diameter of the topological insulator tubes. In some implementations, the average thickness t of the coating is no greater than about 20 times or no greater than about 10 times the average diameter of the topological insulator tubes. In some implementations, the average thickness, t, of the coating is no greater than about 5 times, no greater than about 3 times, or no greater than about 2 times the average diameter of the topological insulator tubes. In other implementations, the average thickness t of the coating is no greater than about 3 times the average length of the topological insulator tubes. In some implementations, the average thickness t of the coating is no greater than about 2 times, no greater than about 1.5 times, or no greater than about 1 times the average length of the topological insulator tubes.

In addition, the coating of a coated optical element described herein is disposed on a surface of an optical element. In some implementations, the coating is disposed directly on the surface of the optical element. Moreover, in some implementations, the coating is bonded or adhered to the surface of the optical element. The bonding, in some implementations, comprises chemical bonding. In some implementations, bonding comprises physical bonding. Bonding, in some implementations, comprises or consists of one or more of covalent bonding, ionic bonding, hydrogen bonding, electrostatic interactions, and van der Waals interactions. In some implementations, for instance, bonding comprises or consists of van der Waals interactions.

In some implementations, a TI coating described herein resists delamination or other detachment from the optical element over time, including when exposed to adverse environmental conditions, such as extreme temperatures, high humidity, dust, or electromagnetic radiation exposure, or when exposed to variations or cycles of exposure to such conditions. Accordingly, the coating can comprise an adhesion energy of, for example, from about 0.5 to about 5 eV. Further, in some implementations, a coating described herein is continuous or substantially continuous across the entire surface of the optical element.

Any optical element not inconsistent with the objectives of the present disclosure can be used. In some implementations, an optical element comprises a lens, window, substrate, or display cover. In some implementations, an optical element comprises a grating. In some implementations, an optical element comprises an organic light emitting diode (OLED) or a liquid crystal display. Moreover, in some implementations, an optical element comprises or is formed from an inorganic material such as an inorganic oxide or inorganic glass. In some implementations, an optical element is formed from an aluminum oxide, such as sapphire. In some implementations, an optical element is formed from silica or quartz, including fused quartz. In some implementations, an optical element is formed from one or more of BK7 optical glass, SUPRASIL, and INFRASIL.

Further, a coated optical element described herein, in some implementations, can exhibit one or more desired properties. In some implementations, for instance, a coated optical element exhibits a high optical transmittance, including in the visible region of the electromagnetic spectrum. For reference purposes herein, optical transmittance is relative to the total amount of incident radiation in a given wavelength range. Optical transmittance can be measured with a broad spectral source or a narrow spectral source. Moreover, optical transmittance of an element can be measured in any manner not inconsistent with the objectives of the present disclosure, including with any suitable instrumentation. For example, in some implementations, optical transmittance is measured with a spectrometer such as a BECKMAN spectrometer.

In some implementations, a coated optical element described herein exhibits an optical transmittance of at least about 90 percent or at least about 95 percent at wavelengths from about 350 nm to about 750 nm. In some implementations, a coated optical element exhibits a transmittance of at least about 98 percent at wavelengths from about 350 nm to about 750 nm. In some implementations, a coated optical element exhibits a transmittance of at least about 99.9 percent or at least about 99.99 percent at wavelengths from about 350 nm and about 750 nm. In some implementations, a coated optical element exhibits an optical transmittance of from about 90 percent to about 99.99 percent or from about 95 percent to about 98 percent at wavelengths from about 350 nm to about 750 nm. Moreover, in some implementations, a coated optical element described herein exhibits an optical transmittance of about 85 percent to about 99.99 percent or about 90 percent to about 95 percent at wavelengths from about 200 nm to about 800 nm or from about 220 nm to about 350 nm.

In addition, in some implementations, the optical transmittance of a coated optical element described herein is at least about 90 percent, at least about 95 percent, or at least about 99 percent of the optical transmittance of the uncoated optical element in a given wavelength range, such as at wavelengths from about 350 nm to about 750 nm or from about 220 nm to about 350 nm. In some implementations, the optical transmittance of a coated optical element is from about 85 percent to about 99.99 percent, or from about 95 percent to about 98 percent of the optical transmittance of the uncoated optical element.

Further, in some implementations, a coated optical element described herein exhibits low Fresnel reflection loss. For reference purposes herein, Fresnel reflection loss refers to the amount of incident light reflected by an element. In some implementations, a coated optical element described herein exhibits a Fresnel loss of less than about 3 percent. In some implementations, a coated optical element exhibits a Fresnel loss of less than about 2 percent or less than about 1 percent. In some implementations, a coated optical element exhibits a Fresnel loss of less than about 0.1 percent. In addition, in some implementations, the Fresnel loss of a coated optical element described herein is within about 10 percent or less of the Fresnel loss of the uncoated optical element in a given wavelength range, such as at wavelengths from about 350 nm to about 750 nm or from about 220 nm to about 350 nm. In some implementations, the Fresnel loss of a coated optical element is within about 5 percent or less or about 1 percent or less of the uncoated optical element. In some implementations, the Fresnel loss of a coated optical element is within about 0.5 percent or less or about 0.1 percent or less of the Fresnel loss of the uncoated optical element.

Moreover, in some implementations, a coated optical element described herein exhibits a high mechanical hardness, stiffness, or resistance to compression. In some implementations, the coating of a coated optical element as described herein exhibits a tensile modulus of up to about 2 TPa, up to about 1 TPa, up to about 500 GPa, up to about 100 GPa, up to about 50 GPa, up to about 30 GPa, including from about 1 GPa to about 1 TPa, from about 500 GPa to about 1 TPa, or from about about 10 GPa to about 30 GPa as measured by nanoindentation in an atomic force microscope (AFM), for example, according to the method described in "Measurement of the Elastic Properties and Intrinsic Strength of Monolayer Graphene," Science, Vol. 321 No. 5887.

Further, in some implementations, a coated optical element described herein can exhibit a combination of properties described herein, including a combination of optical and mechanical properties. A coated optical element described herein can exhibit any combination of properties and features not inconsistent with the objectives of the present disclosure.

In some implementations, a coated optical element described herein exhibits two or more or three or more of the foregoing features. In some implementations, a coated optical element described herein exhibits four or more of the foregoing features. Thus, in some implementations, a thin coating layer described herein can provide improved mechanical performance without substantial alteration or degradation of optical properties. Moreover, in some implementations, a coated optical element described herein can maintain desirable performance features when exposed to adverse environmental conditions.

In another aspect, apparatuses are described herein. In some implementations, an apparatus comprises a coated optical element comprising an optical element and a coating disposed on a surface of the optical element, wherein the coating comprises at least one layer comprising a topological insulator, and wherein the coated optical element is exposed to the external environment of the apparatus. Further, in some implementations, the coated optical element of the apparatus is not enclosed in a protective housing such as an environmentally controlled housing. A coated optical element of an apparatus described herein can comprise any coated optical element described herein.

Figure 4:
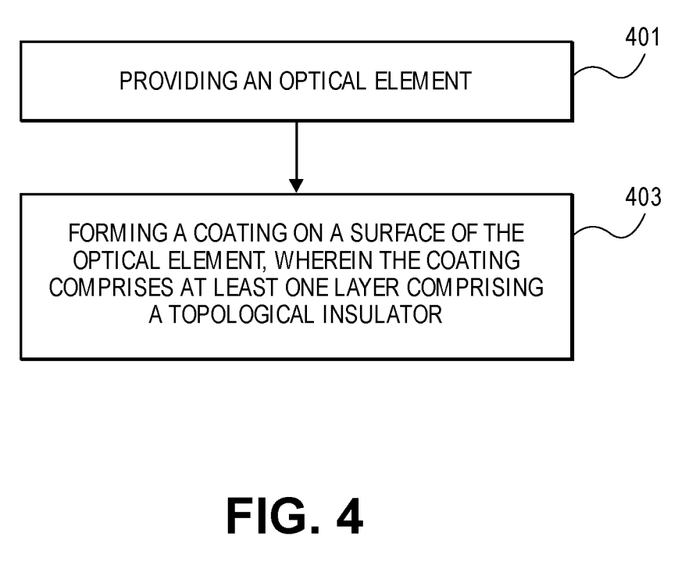
FIG. 4 provides a flow chart illustrative of a method of coating an optical element according to one implementation described herein.

In yet another aspect, methods of coating an optical element are described herein. In some implementations, for example as illustrated in FIG. 4, a method 400 of coating an optical element comprises providing an optical element at 401 and forming a coating on a surface of the optical element, wherein the coating comprises at least one layer comprising a topological insulator at 403.

Turning now to specific steps of methods, methods of coating an optical element described herein comprise providing an optical element. Any optical element not inconsistent with the objectives of the present disclosure can be used. In some implementations, the optical element comprises an optical element described hereinabove. For example, in some implementations, an optical element comprises a lens, window, substrate, display cover, or grating formed from an inorganic material such as an inorganic glass. In some implementations, an optical element is formed from silica or quartz.

Methods of coating an optical element described herein also comprise forming a topological insulator coating on a surface of the optical element. The topological insulator coating can be formed on the surface of the optical element in any manner not inconsistent with the objectives of the present disclosure. In some implementations, for example, forming of the coating is carried out using vapor deposition. Vapor deposition, in some implementations, comprises chemical vapor deposition (CVD). For example, in some implementations, CVD can be used to provide a coating comprising at least one topological insulator. Any CVD method not inconsistent with the objectives of the present disclosure can be used. For example, in some implementations, one or more of atmospheric pressure CVD, ultrahigh vacuum CVD, or hot filament (or hot wire or catalytic) CVD can be used. In some implementations, a CVD method comprises forming a coating from one or more hydrogen or sodium-containing gas-phase reactants. In some implementations, a gas-phase reactant comprises a hydrocarbon. In some implementations, a gas-phase reactant comprises benzene, ethane, methane, or a combination or mixture thereof. Further, in some implementations, a gas-phase reactant is provided in a carrier gas such as $H_2$.

In other implementations, forming of the coating is carried out using catalytic vapor phase deposition. For instance, in some implementations, catalytic vapor deposition can be used to provide a coating comprising at least one layer of topological insulator tubes having a vertical or substantially vertical orientation described herein. Any catalytic vapor phase deposition method not inconsistent with the objectives of the present disclosure can be used. In some implementations, a catalytic vapor phase deposition method comprises disposing metal catalyst particles on a surface of an optical element. The metal catalyst particles, in some implementations, can be disposed on the optical element in an array, such as an ordered array of equally spaced particles. Further, the metal catalyst particles can have any size and chemical composition not inconsistent with the objectives of the present disclosure. Moreover, the size of the metal catalyst particles, in some implementations, is selected to obtain a desired topological insulator tube diameter. In some implementations, for example, the metal catalyst particles have an average diameter ranging from about 1 nm to about 20 nm or about 1 nm to about 10 nm. In some implementations, the metal catalyst particles have an average diameter of less than about 1 nm. Further, in some implementations, the metal catalyst particles comprise one or more transition metals, including pure metals, metal alloys, or mixtures of metals. In some implementations, the metal catalyst particles comprise nickel particles. In other implementations, the metal catalyst particles comprise a noble metal such as gold or silver.

In addition, in some implementations, a catalytic vapor phase deposition method described herein further comprises disposing the optical element in a vacuum chamber and heating the optical element. An optical element comprising a layer of metal catalyst particles can be heated in the vacuum chamber to any temperature not inconsistent with the objectives of the present disclosure. In some implementations, the optical element is heated to a temperature of from about 600° C. to about 800° C. In some implementations, the optical element is heated to a temperature of about 700° C.

In some implementations, a catalytic vapor phase deposition method further comprises introducing one or more gases into the vacuum chamber, wherein at least one gas comprises a hydrogen or sodium-containing species. In some implementations, a hydrogen or sodium-containing gas such as a hydrocarbon or sodium-substituted hydrocarbon is introduced with a process gas such as ammonia or nitrogen. In this manner, in some implementations, a layer of topological insulator tubes can be grown on the metal catalyst particles disposed on the optical element.

In other implementations, forming of the coating is carried out using laser ablation. Any laser ablation method not inconsistent with the objectives of the present disclosure can be used. In some implementations, a laser ablation method comprises disposing a bismuth or tellurium target and an optical element in a high-temperature reaction chamber and exposing the target to a pulsed laser beam to vaporize at least a portion of the target. In some implementations, a laser ablation method further comprises providing one or more inert gases in the reaction chamber. Providing one or more inert gases, in some implementations, comprises flowing the inert gases through the reaction chamber. Moreover, in some implementations described herein, a surface of the optical element within the reaction chamber is cooler than the ablation temperature, so that vaporized carbon condenses on the surface of the optical element. In some implementations, the condensed bismuth telluride forms topological insulator tubes on the surface of the optical element. Further, in some implementations, a method described herein further comprises applying an electrical field or voltage to the optical element during condensation to provide a preferred growth direction of the topological insulator tubes. In this manner, in some implementations, a coated optical element can be provided, wherein the coated optical element comprises a coating comprising topological insulator tubes, including those having a preferred orientation. In some implementations, the topological tubes are horizontally or substantially horizontally oriented and in other implementations, the topological tubes are oriented such that their long axis is placed in a direction offset by an angle of from 0° to 90° from a major plane of the optical element surface.

A coating formed according to a method described herein can have a thickness of about 200 nm or less. In some implementations, the thickness of the coating is selected by varying the deposition time, where a shorter deposition time provides a thinner coating. Further, a deposition time, in some implementations, can be selected using information obtained from a microbalance (such as a quartz crystal microbalance) arranged to determine the mass of material deposited on an optical element. In some implementations, the information is obtained in real-time by providing information regarding the output of the microbalance (e.g., a measured mass change of an optical element) to the deposition apparatus such as a chemical vapor deposition system, thereby forming a feedback loop.

While the examples have been illustrated respect to one or more implementations, alterations and/or modifications may be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A coated optical element comprising:
    an optical element comprising an optical characteristic, the optical characteristic being one of high optical transmittance of at least 90% from about 350 nm to about 750 nm and low Fresnel reflection loss of less than about 3 percent from about 350 nm to about 750 nm; and
    a coating disposed on a surface of the optical element, wherein the coating comprises at least one layer comprising at least one topological insulator, the at least one topological insulator comprising a plurality of topological insulator nanotubes, and wherein the coating does not substantially alter the optical characteristic of the optical element.

2. The coated optical element of claim 1, wherein the at least one layer comprises a thickness greater than about 20 nm.

3. The coated optical element of claim 1, wherein the coating exhibits an optical transmittance of at least about 95 percent at wavelengths from about 200 nm to about 800 nm.

4. The coated optical element of claim 1, wherein the coating does not comprise graphene.

5. The coated optical element of claim 1, wherein the at least one topological insulator comprises bismuth (Bi).

6. The coated optical element of claim 1, wherein the topological insulator comprises samarium hexaboride.

7. The coated optical element of claim 1, wherein the topological insulator comprises a two-dimensional topological insulator.

8. The coated optical element of claim 1, wherein the topological insulator comprises one or more topological insulator sheets.

9. The coated optical element of claim 3, wherein the at least one layer comprises a thickness of greater than 100 nm.

10. The coated optical element of claim 1, wherein the topological insulator comprises a plurality of topological insulator nanotubes and wherein the plurality of topological insulator nanotubes have a horizontal orientation.

11. The coated optical element of claim 1, wherein the topological insulator comprises a plurality of topological insulator nanotubes and wherein the topological insulator nanotubes have a vertical orientation.

12. The coated optical element of claim 1, wherein the optical characteristic being one of high optical transmittance of at least 95% from about 350 nm to about 750 nm and low Fresnel reflection loss of less than about 1 percent from about 350 nm to about 750 nm.

13. The coated optical element of claim 1, wherein the optical characteristic being one of high optical transmittance of at least 98% from about 350 nm to about 750 nm and low Fresnel reflection loss of less than about 0.1 percent from about 350 nm to about 750 nm.

14. An apparatus comprising:
    a coated optical element comprising an optical element and a coating disposed on a surface of the optical element,
    wherein the optical element comprises an optical characteristic, the optical characteristic being one of high optical transmittance of at least 90% from about 350 nm to about 750 nm and low Fresnel reflection loss of less than about 3 percent from about 350 nm to about 750 nm,
    wherein the coating comprises at least one layer comprising a topological insulator, the one topological insulator comprises a plurality of topological insulator nanotubes,
    wherein the coating does not substantially alter the optical characteristic of the optical element, and
    wherein the coated optical element is exposed to an external environment of the apparatus.

15. The apparatus of claim 14, wherein the topological insulator comprises a two-dimensional topological insulator.

16. The apparatus of claim 14, wherein the at least one layer comprises a thickness of from about 20 nm to about 200 nm.

17. The apparatus of claim 14, wherein the coating does not comprise graphene.

18. The apparatus of claim 14, wherein the topological insulator comprises bismuth (Bi).

19. The apparatus of claim 14, wherein the topological insulator comprises samarium hexaboride.

20. The apparatus of claim 14, wherein the coating exhibits an optical transmittance of at least about 95 percent at wavelengths from about 200 nm to about 800 nm.

* * * * *